United States Patent [19]

Foster

[11] Patent Number: 4,634,408

[45] Date of Patent: Jan. 6, 1987

[54] BELT TENSIONER, PART THEREFOR AND METHODS OF MAKING THE SAME

[75] Inventor: Randy C. Foster, Springfield, Mo.

[73] Assignee: Dayco Corporation, Dayton, Ohio

[21] Appl. No.: 842,099

[22] Filed: Mar. 20, 1986

Related U.S. Application Data

[60] Division of Ser. No. 633,154, Jul. 20, 1984, which is a continuation of Ser. No. 391,643, Jun. 25, 1982, abandoned, which is a continuation-in-part of Ser. No. 301,351, Sep. 11, 1981, Pat. No. 4,413,982.

[51] Int. Cl.⁴ ............................................. F16H 7/12
[52] U.S. Cl. ................................................... 474/135
[58] Field of Search .............. 474/133, 136, 134, 135, 474/115

[56] References Cited

U.S. PATENT DOCUMENTS

| | | | |
|---|---|---|---|
| 403,048 | 5/1889 | Jones | 474/138 |
| 447,301 | 3/1891 | Dootoor | 474/135 |
| 4,285,676 | 8/1981 | Kraft | 474/135 |
| 4,413,982 | 11/1983 | Foster | 474/138 |
| 4,425,103 | 1/1984 | Foster | 474/138 |

FOREIGN PATENT DOCUMENTS

| | | |
|---|---|---|
| 72134 | 2/1983 | European Pat. Off. |
| 2327338 | 12/1974 | Fed. Rep. of Germany |
| 2736980 | 11/1978 | Fed. Rep. of Germany |
| 2902182 | 7/1980 | Fed. Rep. of Germany |

Primary Examiner—James A. Leppink
Assistant Examiner—Frank H. McKenzie, Jr.
Attorney, Agent, or Firm—Joseph V. Tassone

[57] ABSTRACT

A tensioner for a power transmission belt that is adapted to be operated in an endless path and a method of making the same are provided, the tensioner comprising a support unit for being fixed relative to the belt, a belt engaging unit carried by the support unit and being movable relative thereto, a mechanical spring unit operatively associated with the support unit and the belt engaging unit for urging the belt engaging unit relative to the support unit and against the belt with force to tension the belt, and a fluid dampening unit operatively associated with the support unit and the belt engaging unit to dampen the movement of the belt engaging unit relative to the support unit in at least one direction of movement thereof, the fluid dampening unit comprising a rotary dampening unit and the support unit comprising a shaft. The rotary dampening unit and the spring unit are coaxially spaced apart and coaxially aligned on the shaft with the belt engaging unit having a portion thereof disposed between the rotary dampening unit and the spring unit and being rotatably carried by the shaft.

20 Claims, 21 Drawing Figures

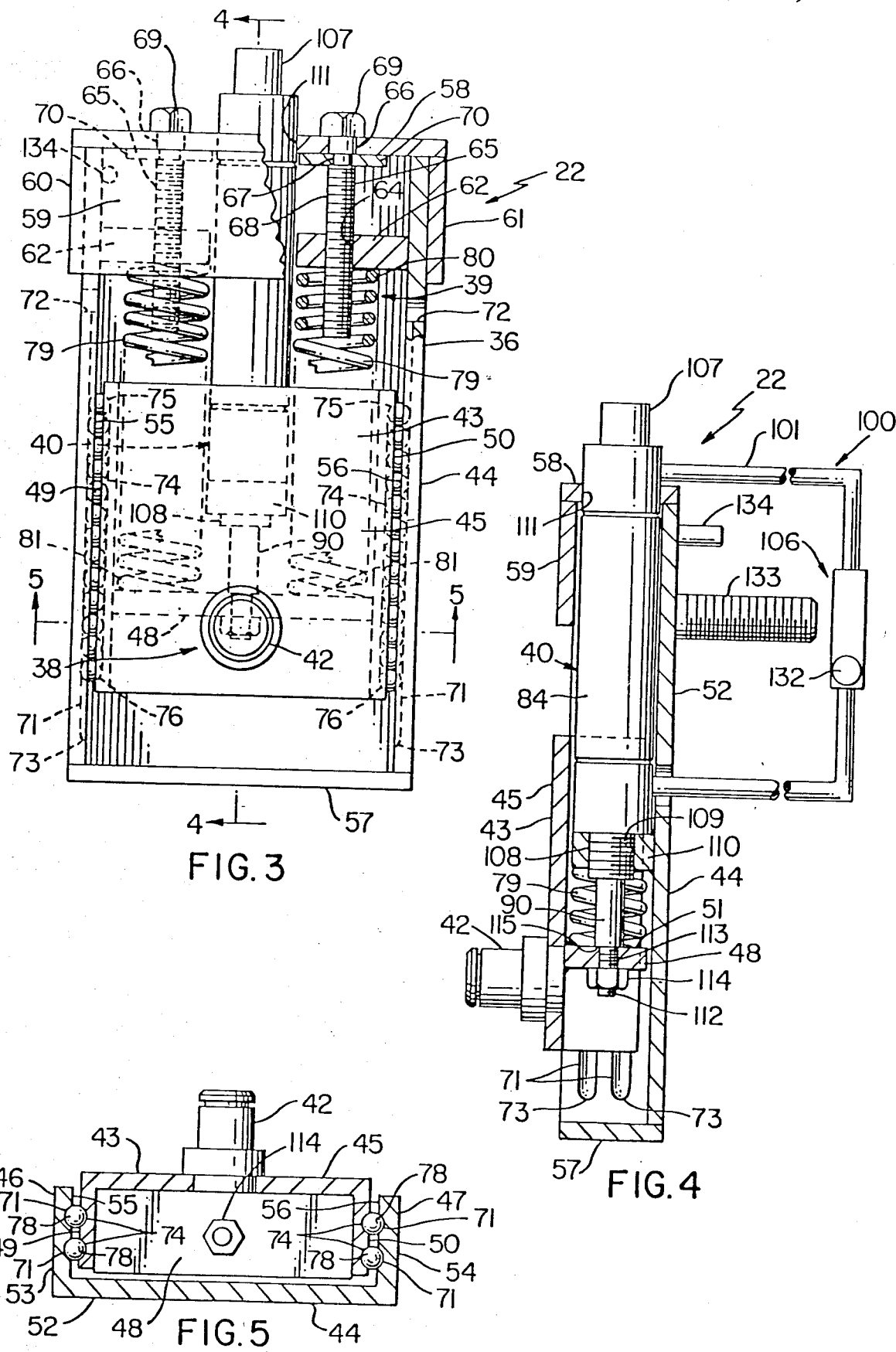

BELT TENSIONER, PART THEREFOR AND METHODS OF MAKING THE SAME

CROSS REFERENCE TO RELATED APPLICATION

This application is a divisional application of its copending parent application, Ser. No. 633,154, filed July 20, 1984, which, in turn is a continuation application of its copending parent application, Ser. No. 391,643, filed June 25, 1982, now abandoned, which, in turn is a continuation-in-part patent application of its copending parent patent application, Ser. No. 301,351, filed Sept. 11, 1981, now U.S. Pat. No. 4,413,982.

BACKGROUND OF THE INVENTION

1. Field of the Invention

This invention relates to an improved tensioner for an endless power transmission belt or the like, an improved part for such a tensioner or the like and to methods of making such a tensioner and/or part therefor.

2. Prior Art Statement

It is known to applicant to provide a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof.

For example, see the copending patent application Ser. No. 296,694, filed Aug. 27, 1981 of Leslie B. Wilson, wherein the fluid dampening means comprises a cylinder means having a piston means therein and defining two chambers for fluid in the cylinder means on opposite sides of the piston means together with preferential flow control means interconnecting the two chambers together.

Also see the copending patent application Ser. No. 296,697, filed Aug. 27, 1981 of Randy C. Foster et al wherein another such tensioner is provided and the fluid dampening means thereof comprises a cylinder means having a piston means therein and defining two chambers for fluid in the cylinder means on opposite sides of the piston means with the spring means being disposed in one of those chambers.

It is also known to provide a belt tensioner with a friction surface dampening means of the solid type utilized to tend to dampen vibrations and the like that are imposed on the belt tensioner.

It is also known to provide fluid couplings, such as torque converters, wherein rotational movement of one member causes rotational movement of another member because a fluid translates such movement between the two members, each member having vanes thereon.

SUMMARY OF THE INVENTION

It is one feature of this invention to provide an improved tensioner for a power transmission belt or the like.

In particular, it was found according to the teachings of the invention in the copending parent patent application, Ser. No. 301,351, filed Nov. 11, 1981, that a relatively small and compact belt tensioner could be provided by uniquely arranging the mechanical spring means thereof and the fluid dampening means thereof in a manner believed to be more compact than the arrangements set forth in the aforementioned copending patent applications, Ser. No. 296,694, filed Aug. 27, 1981, of Leslie B. Wilson and Ser. No. 296,697, filed Aug. 27, 1981, of Randy C. Foster et al, both of these copending patent applications being hereby incorporated into this disclosure by this reference thereto.

In particular, it was found according to the teachings of that invention that the spring means of a belt tensioner can comprise a pair of springs disposed in substantially parallel spaced relation with the fluid dampening means having at least a part thereof disposed between the springs in substantially parallel relation therewith to render the belt tensioner substantially small and compact.

For example, one embodiment of that invention provides a tensioner for a power transmission belt that is adapted to be operated in an endless path, the tensioner comprising a support means for being fixed relative to the belt, a belt engaging means carried by the support and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof, the mechanical spring means comprising a pair of springs disposed in substantially parallel spaced relation with the fluid dampening means having at least a part thereof disposed between the springs and in substantially parallel relation therewith.

It is another feature of that invention to provide an improved fluid dampening means for a belt tensioner or the like.

In particular, it was found according to the teachings of that invention that the fluid dampening means for a belt tensioner could comprise a rotary dampening means.

For example, another embodiment of that invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and a fluid dampening means operatively associated with the support means and the belt engaging means to dampen the movement of the belt engaging means relative to the support means in at least one direction of movement thereof, the fluid dampening means comprising a rotary dampening means.

It is another feature of that invention to provide an improved part for such a tensioner, the improved part being the rotary dampening means previously described.

However, it is believed that such improved rotary dampening means or device can be utilized for other purposes than for a belt tensioner and therefore that invention is not to be limited to a rotary dampening means only for a belt tensioner.

For example, another embodiment of that invention provides a fluid dampening device comprising a first member, and a second member disposed in the first member with the members being arranged for relative movement therebetween and cooperating together so that a fluid therein will tend to dampen such movement in at least one direction, one of the members being rotatably mounted relative to the other of the members whereby the fluid dampening device is a rotary dampening device.

It was found according to the teachings of this invention that the previously described tensioner could have the rotary dampening means and the spring means coaxially aligned to render the tensioner relatively small and compact.

For example, one embodiment of this invention provides a tensioner for a power transmission belt that is adapted to be operated in an endless path, the tensioner comprising a support means for being fixed relative to the belt, a belt engaging means carried by the support means and being movable relative thereto, mechanical spring means operatively associated with the support means and the belt engaging means for urging the belt engaging means relative to the support means and against the belt with a force to tension the belt, and fluid dampening means operatively associated with the support means and the belt engaging means to dampen the movement of the belt engaging means relative to the support means in at least one direction of movement thereof, the fluid dampening means comprising a rotary dampening means having a rotatable means and a longitudinal axis about which the rotatable means rotates. The spring means has a longitudinal axis and is spiraled about the axis thereof. The support means comprises a shaft means having a longitudinal axis and is fixed from movement relative to the belt engaging means, the shaft means carrying the dampening means and the spring means in spaced apart side-by-side relation thereon with the axis of the shaft means being substantially coaxial with the axes of the dampening means and the spring means whereby the rotary dampening means and the spring means are coaxially spaced apart and are coaxially aligned by the shaft means. The belt engaging means has a portion thereof disposed between the rotary dampening means and the spring means and is rotatably carried by the shaft means so as to rotate relative to the shaft means whereby the rotary dampening means and the spring means are coaxially spaced from each other by the portion of the belt engaging means.

Accordingly, it is an object of this invention to provide an improved tensioner for a power transmission belt or the like that is adapted to be operated in an endless path, the tensioner of this invention having one or more of the novel features of this invention as set forth above or hereinafter shown or described.

Another object of this invention is to provide an improved method of making a tensioner for a power transmission belt or the like that is adapted to be operated in an endless path, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an enlarged front view, partially broken away and partially in cross section, of the belt tensioner of this invention that is being utilized for tensioning the power transmission belt of FIGS. 1 and 2.

FIG. 4 is a cross-sectional view taken on lines 4—4 of FIG. 3.

FIG. 5 is a cross-sectional view taken on lines 5—5 of FIG. 3.

DESCRIPTION OF THE PREFERRED EMBODIMENTS

Figure 1:
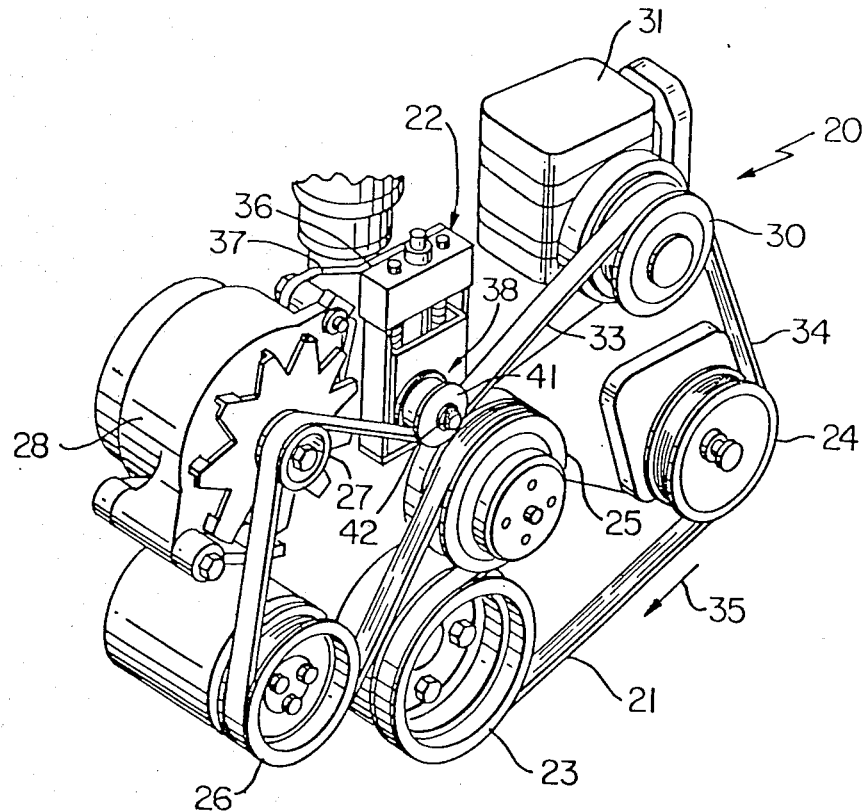
FIG. 1 is a fragmentary isometric view looking toward the front end of an automobile engine which utilizes one embodiment of the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a belt tensioner for other arrangements as desired.

Also, while the improved rotary dampening means of this invention is described and illustrated as providing part of a belt tensioner, it is to be understood that the improved rotary dampening means of this invention can be utilized for other purposes as desired.

Therefore, this invention is not to be limited to only the embodiments illustrated in the drawings, because the drawings are merely utilized to illustrate one of the wide variety of uses of this invention.

Figure 2:
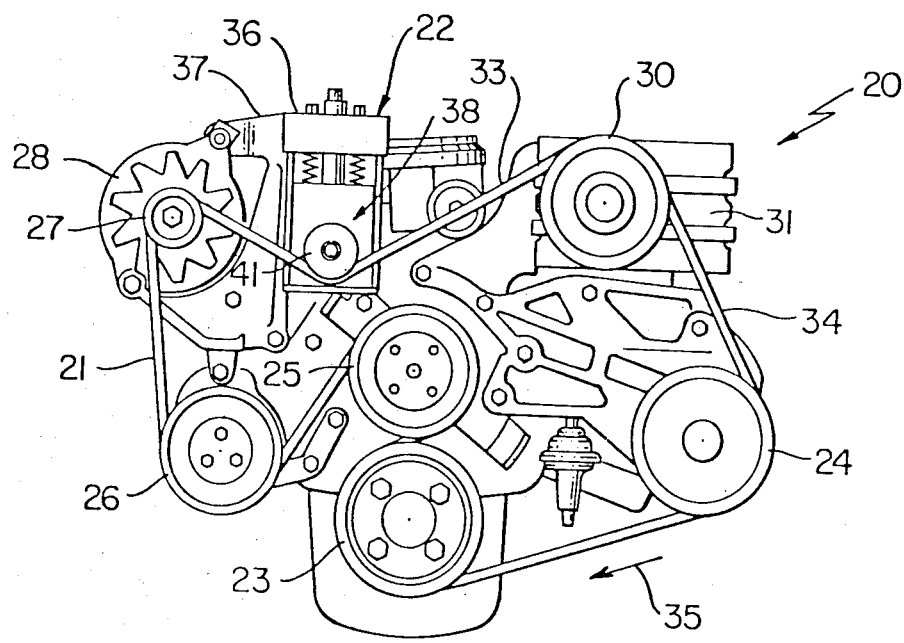
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because the unique features of the tensioner 22 of this invention readily permits the tensioner 22 to tension a belt having a polyester load-carrying cord in an efficient manner as hereinafter described.

The belt 21 is driven by a driving sheave 23 which is operatively interconnected to the crankshaft of the engine 20 in a manner well known in the art. The driving sheave 23 drives the belt 21 in an endless path and thereby drives a sheave 24 of a power steering device using in an automobile (not shown) utilizing the engine 20, a sheave 25 of an engine water pump, a sheave 26 of an air pump of a type used in an antipollution system for the engine 20, a sheave 27 of an engine electrical alternator 28, and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the air compressor 31. This cyclic change and load varies between greater extremes in application where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produce variations in the length of the belt 21 that require compensation for the same.

Thus, it is known that it is difficult to maintain such a belt 21 under tension with a force required to insure non-slipping engagement and driving of the driven sheaves whereby numerous belt tensioners have been proposed and used heretofore in an effort to provide the required tension.

It is believed that the improved belt tensioner 22 of this invention functions in a manner to provide a proper tensioning force on the belt 21 to overcome the aforementioned problems, namely, provides the required tension in the overall belt 21 as well as prevents any tendency of the belt to oscillate in an undesirable manner as a result of the cyclic load change imposed by the compressor 31 whereby the improved belt tensioner 22 of this invention will now be described.

Figure 6:
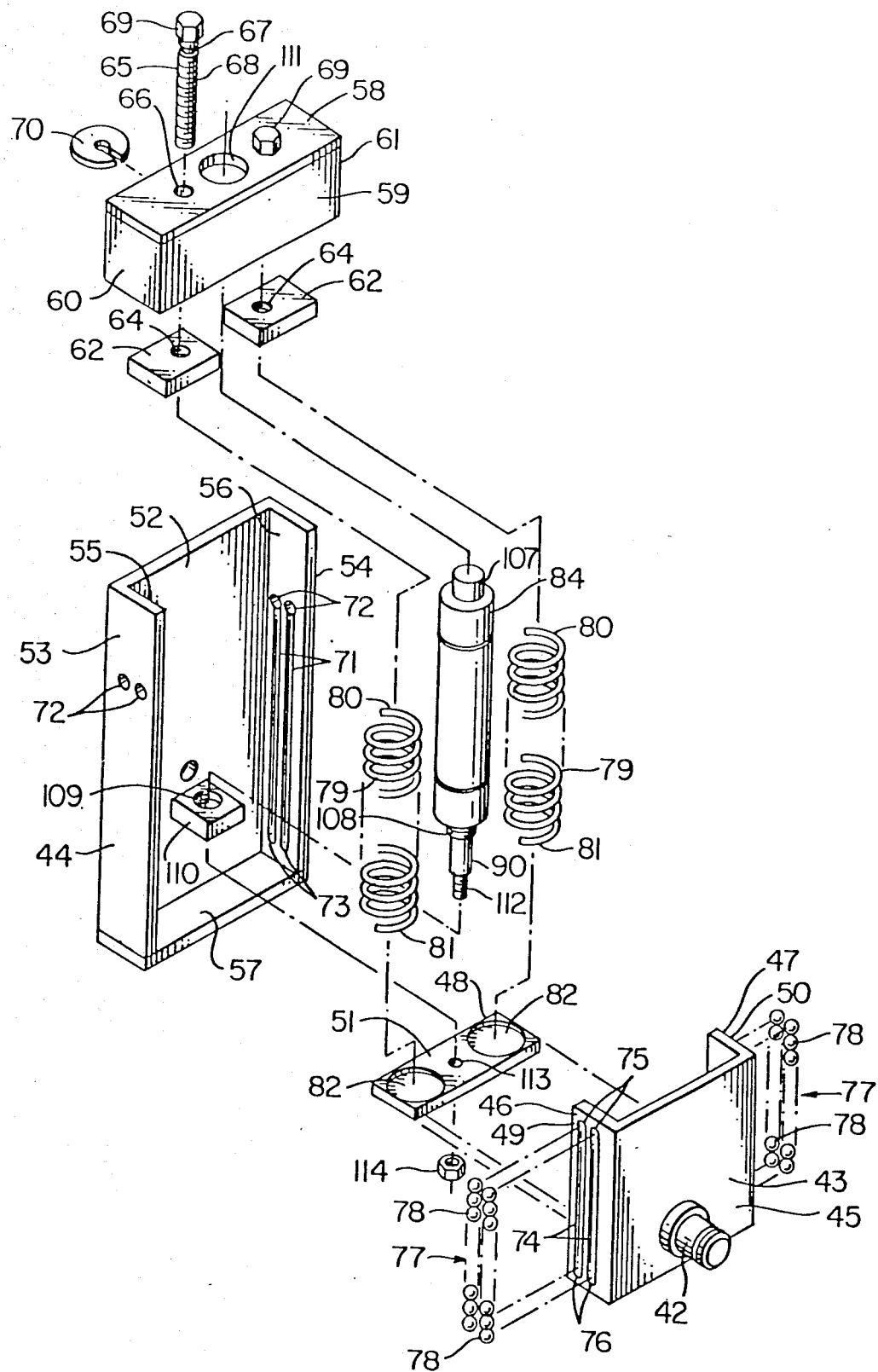
FIG. 6 is an exploded perspective view of the various parts forming the belt tensioner of FIGS. 3-5.

As best illustrated in FIGS. 3 and 6, the improved belt tensioner 22 of this invention comprises a support means 36 adapted to be fixed to a mounting bracket 37 of the engine 20 as illustrated in FIGS. 1 and 2. A belt engaging means that is generally indicated by the reference numeral 38 is movably carried by the support means 36 in a manner hereinafter set forth. The tensioner 22 has mechanical spring means that is generally indicated by the reference numeral 39 operatively associated with the support means 36 and belt engaging means 38 to tend to urge the belt engaging means 38 against the slack side 33 of the belt 21 in substantially a true vertically downwardly direction in a manner to substantially bisect the angle made by the belt 21 between the sheaves 27 and 30 as illustrated in FIG. 2.

The belt tensioner 22 also includes a fluid dampening means that is generally indicated by the reference numeral 40 and is operatively associated with the support means 36 and the belt engaging means 38 to dampen movement of the belt engaging means 38 relative to the support means 36 in a manner hereinafter set forth.

The belt engaging means 38 comprises an idler pulley 41 rotatably mounted on an axle 42 carried by a slide member 43 disposed for sliding in a box-like member 44 of the support means 36 in a manner hereinafter set forth, the slide member 43 having a substantially rectangular front wall 45 and a pair of rearwardly extending substantially parallel rectangular and integral side walls 46 and 47 being bridged by a transverse wall 48 secured thereto in any suitable manner, such as by welding or the like. In this manner, the rearwardly extending side walls 46 and 47 define a pair of outwardly facing substantially parallel surfaces 49 and 50 while the transverse wall 48 defines a surface 51 that is disposed between and transverse to the side surfaces 49 and 50 for a purpose hereinafter described.

The box-like member 44 of the support means 36 has a substantially rectangular rear wall 52 with a pair of forwardly extending parallel and integral side walls 53 and 54 which respectively define inwardly facing substantially parallel surfaces 55 and 56 for respectively facing the side surfaces 49 and 50 of the slide member 43 of the belt engaging means 38 for a purpose that will be apparent hereinafter.

A substantially rectangular bottom wall 57 is secured to the rear wall 52 and side walls 53 and 54 of the support member 44 in any suitable manner, such as by welding or the like, and a substantially rectangular top wall 58 is likewise secured to the rear wall 52 and side walls 53 in any suitable manner, such as by welding or the like. In addition, a partial substantially rectangular front wall 59 and partial side walls 60 and 61 are carried by the top wall 58 and extend across and overlap the side walls 53 and 54 in a cap-like manner as illustrated in FIGS. 3 and 4 to provide a means for capturing and guiding up and down movement of a pair of substantially rectangular spring retainers 62 which respectively have threaded openings 64 passing therethrough and respectively threadedly receiving threaded adjusting members 65 that are rotatably carried in openings 66 in the top wall 58.

In particular, each threaded adjusting member 65 has a reduced non-threaded section 67 intermediate the threaded portion 68 thereof and an enlarged head 69 thereof that is telescopically received in an opening 66 of the top wall 58 and is held therein by a C-shaped clip 70 in a manner well known in the art so that rotation of the particular threaded fastening member 65, such as by turning the head 69 thereof with a suitable tool or the like, will cause rotation of the adjusting member 65 and, thus, a threading relation of its respective spring retainer 62 upwardly or downwardly on the threaded fastening member 65 within the top cap portion of the box-like support member 44 for a purpose hereinafter described.

The facing side surfaces 55 and 56 of the box-like support member 44 respectively are provided with a pair of parallel grooves 71 that respectively extend from openings 72 formed through the respective side wall 53 or 54 to the ends 73 thereof.

In a similar manner the outwardly facing side surfaces 49 and 50 of the slide member 43 of the belt engaging means 38 each has a pair of parallel grooves 74 formed therein with each groove 74 terminating at the opposed ends 75 and 76 thereof.

The grooves 74 of the slide member 43 cooperate with the grooves 71 of the support member 44 to carry bearing means that are generally indicated by the reference numeral 77 and that facilitate sliding movement of the slide member 43 relative to the support member 44.

In particular, the bearing means 77 comprise a plurality of ball bearings 78 that substantially fill the grooves 74 of the slide member 43 and partially fill the grooves 77 of the support member 44 to permit up and down sliding movement of the slide member 43 within the box-like member 44 as illustrated in FIGS. 3 and 4.

In order to initially dispose the ball bearings 78 in the cooperating grooves 71, 74, the slide member 43 is positioned in the member 44 so that the upper ends 75 of the grooves 74 are slightly above the openings 72 in the side walls 53 and 54 of the member 44 so that the ball bearings 78 can be fed through the openings 72 into the cooperating grooves 71 and 74. Once the grooves 74 have been filled with the ball bearings 78, the slide member 43 is moved downwardly so that the ends 75 of the grooves 74 are below the openings 72 whereby the ball bearings 78 cannot excape from the cooperating grooves 71, 74, the openings 72 being so positioned that the normal range of up and down movement of the slide member 43 relative to the box-like member 44 during its belt tensioning function of the tensioner 22 in a manner hereinafter set forth will not cause the upper ends 75 of the grooves 74 of the slide member 43 to reach the openings 72 whereby the ball bearings 78 are fully captured in the cooperating grooves 71 and 74 for their substantially frictionless bearing purpose.

The mechanical spring means 39 of the tensioner 22 of this invention comprises a pair of coiled compression springs 79 disposed in spaced apart parallel relation in the box-like support member 44 and respectively have upper ends 80 bearing against the adjustable spring retainers 62 while having the lower ends 81 thereof respectively being received in substantially cylindrical recesses 82 formed in the surface 51 of the transverse wall 48 of the slide member 43.

In this manner, the force of the compression springs 79 tends to urge the slide member 43 downwardly relative to the support member 44, the force of the compression springs 79 being adapted to be adjusted by the adjustable spring retainers 62 being axially threaded upwardly and downwardly on the respective threaded adjusting members 65 in the manner previously set forth.

Figure 7:
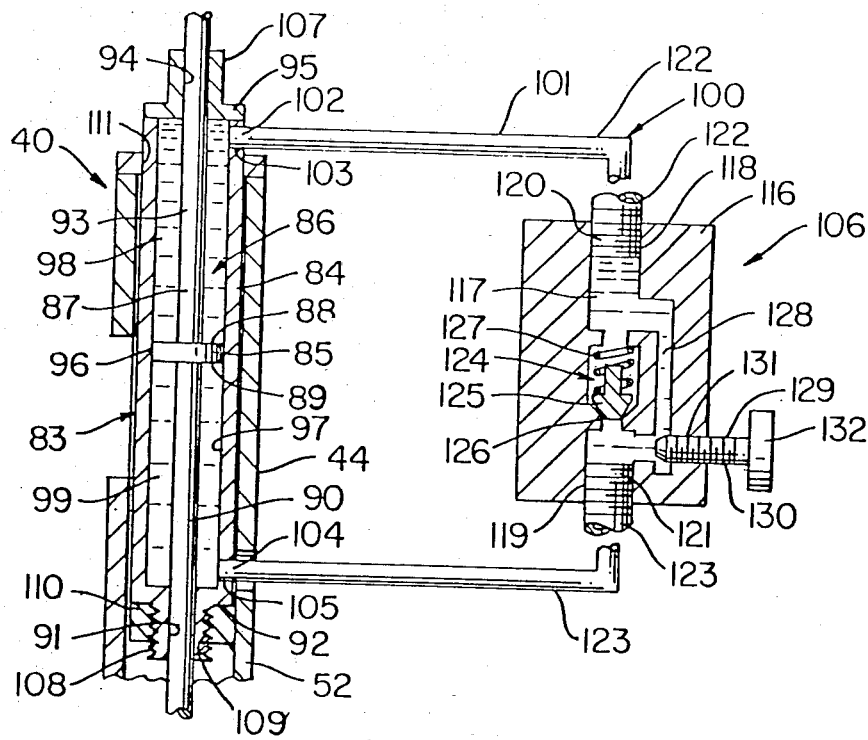
FIG. 7 is a schematic view in cross section and illustrates the fluid flow control means of the fluid dampening means of the belt tensioner of FIGS. 3-6.

The fluid dampening means 40 comprises a piston and cylinder means that is generally indicated by the reference numeral 83 and comprises a cylinder member 84 and a piston member 85, FIG. 7, disposed for movement within a substantially cylindrical chamber 86 formed in the cylinder member 84, the piston member 85 having a piston rod 87 secured thereto and extending from opposed sides 88 and 89 thereof so that a lower part 90 of the piston rod 87 extends out of an opening 91 in an upper end wall 95 of the cylinder member 84.

The piston member 85 of the fluid dampening means 40 has an external peripheral surface 96 disposed in sliding and sealing engagement with the internal peripheral surface 97 of the cylinder member 84 that defines the chamber 86 thereof whereby the piston member 85 divides the chamber 86 into an upper chamber section 98 and a lower chamber section 99 substantially sealed from each other by the piston member 85. However, the chamber sections 98 and 99 are fluidly interconnected together by a passage defining means that is generally indicated by the reference numeral 100 and comprises a conduit means 101 having one end 102 thereof secured in an opening 103 formed through the cylinder member 84 adjacent the end wall 95 thereof while the other end 104 of the conduit means 101 is secured in an opening 105 formed through the cylinder member 84 adjacent the end wall 92, the conduit means 101 having a flow control valve means therein that is generally indicated by the reference numeral 106 and that is utilized for controlling fluid flow through the conduit means 101 in a manner hereinafter described.

The cylinder member 84 has a pair of opposed reduced ends 107 and 108 through which the piston and rod parts 93 and 90 respectively extend, the reduced end 108 being externally threaded to be threadedly received in an internally threaded bore 109 of a substantially rectangular block 110 secured to the rear wall 52 of the support member 44 in any suitable manner, such as welding or the like, whereby the lower end 108 of the cylinder member 84 is secured to the support member 44 so as to be non-movable relative thereto. The upper end 107 of the cylinder member 84 projects out of an opening 111 formed in the top wall 58 of the box-like support member 44.

The piston member 85, in turn, is operatively interconnected to the slide member 43 because the lower piston rod part 90 thereof has a reduced externally threaded section 112 received through an opening 113 formed through the transverse wall 48 of the slide member 43 and carries a nut 114 thereon to sandwich the transverse wall 48 between the nut 114 and an annular shoulder 115 on the piston rod section 90 whereby the piston member 85 will move in unison with the slide member 43 relative to the support member 44 in a manner hereinafter set forth.

Thus, it can be seen that the piston and cylinder means 83 is disposed substantially parallel to the springs 79 and between the same, the springs 79 and piston member 85 being operatively interconnected to the slide member 43 and the springs 79 and cylinder member 84 being operatively interconnected to the support means 36 and thereby permit the tensioner 22 to be substantially small and compact to operate in a manner hereinafter set forth.

The flow control valve means 106 illustrated in FIG. 7 comprises a housing means 116 having a first passage 117 passing therethrough and defining opposed openings 118 and 119 in the housing means 116 that respectively receive ends 120 and 121 of conduit sections 122 and 123 of the conduit means 101 as illustrated, the conduit ends 120 and 121 being secured in the openings 118 and 119 in any suitable manner, such as by the threaded relation illustrated.

A one-way check valve means that is generally indicated by the reference numeral 124 in FIG. 7 is disposed in the first passage means 117 to permit fluid flow from the conduit section 123 to the conduit section 122 and, thus, from the chamber section 99 to the chamber section 98 of the fluid dampening means 40 while preventing reverse flow from the conduit section 122 to the conduit section 123 through the first passage 117 and, thus, from the chamber section 99 of the fluid dampening means 40.

In particular, the one-way check valve means 124 comprises a movable valve member 125 normally urged against a valve seat 126 in the passage means 117 by a compression spring 127 so that fluid pressure from the conduit section 123 will open the valve member 125 against the force of the compression spring 127 to provide full and unrestricted flow of fluid from the conduit section 123 to the conduit section 122 through the passage means 117. However, when fluid flow is from the conduit section 122 toward the conduit section 123 through the passage means 117, the compression spring 127 closes the valve member 125 against the valve seat 126 to prevent such fluid flow.

However, a second passage 128 is formed in the housing means 116 and is interconnected to the passage 117 on opposite sides of the one-way check valve means 124 thereof so as to be in fluid communication with the conduit sections 122 and 123. The passage 128 is adapted to have the flow of fluid thereto controlled by an adjusting member 129 in a manner well known in the art, the adjusting member 129 having a threaded section 130 disposed in a threaded bore 131 in the housing means 116 so that an operator can rotate the adjusting member 129 by grasping a knob end 132 thereof so as to position the adjusting member 129 in a desired flow restricting position thereof to limit the rate of fluid flow through the passage 128 and, thus, the rate of fluid flow from the conduit section 122 to the conduit section 123 through the passage 128 as the one-way valve means 124 is preventing fluid flow at the time through the passage 117 for a purpose hereinafter described.

As previously stated, the piston rod section 90 is interconnected to the belt engaging means 38 while the cylinder member 84 is interconnected to the stationary support means 36 so as the belt engaging means 38 moves downwardly in the drawings in a direction to tension the belt 21, such downward movement of the piston rod 87 and piston member 85 therewith tends to decrease the volume of the chamber section 99 while increasing the volume of the chamber section 98 a like amount. However, the fluid being displaced from the chamber section 99 by the downwardly moving piston 85 must be transferred to the chamber section 98 through the conduit means 101 and, thus, through the flow control valve means 106. Because the fluid flow through the passage 117 of the flow control means 106 is from the conduit section 123 to the conduit section 122, the one-way check valve means 124 is opened and permits such fluid flow therethrough in substantially an unrestricted manner.

Conversely, when the piston rod 87 is moved upwardly by the belt engaging means 38 being moved upwardly by the tensioned belt 21 in a manner hereinafter set forth, such upward movement of the piston rod 87 is retarded or restricted by an amount determined by the setting of the adjusting member 129 of the flow control means 106.

In particular, as the piston member 85 moves upwardly in FIG. 7, the same tends to displace fluid from the chamber section 98 to the chamber section 99 through the passage defining means 100 and thus the fluid flow through the flow control valve means 106 is from the conduit section 122 to the conduit section 123 whereby the one-way check valve means 124 closes the passage 117 so that the entire fluid flow has to pass through the restricted passage 128 of the flow control valve 106 and thereby restricts the upward movement of the belt engaging means 38 relative to the belt 21 for a purpose hereinafter described.

While the flow control valve means 106 has been previously illustrated and described as merely restricting fluid flow in one direction thereof in an adjustable manner, it is to be understood that the flow control valve means 106 can be a fixed flow control valve means, be an adjustable flow control valve means in both directions of flow therethrough and even be adapted to close the passage defining means 100 to substantially lock the idler pulley 41 in a set position relative to the support means 36 as will be apparent hereinafter.

Also, while it is presently preferred that the fluid that fills the chamber sections 98, 99 and the passage defining means 100 comprise a liquid, such as a hydraulic oil, grease or the like, it is to be understood that any suitable fluid, such as air or other gas or gases, can be utilized and will function substantially in the same manner. Therefore, the dampening means 40 is referred to as a fluid dampening means.

In order to mount the tensioner 22 of this invention to the bracket 37 of the engine 20, the rear wall 52 of the support member 44 has an externally threaded fastening member 133 secured thereto and adapted to be received in an opening (not shown) in the bracket 37 and be secured thereto by a nut (not shown) threaded on the threaded fastening member 133 in a manner well known in the art. In order to prevent rotation of the tensioner 22 relative to the support bracket 37, one or more rigid pins 134 can be secured to the rear wall 52 of the support member 44 and be received in suitable openings (not shown) in the bracket 37 at the same time the fastening member 33 is being received in its opening. However, it is to be understood that other mounting means can be utilized to secure the tensioner 22 to the bracket 37 as desired.

Therefore, it can be seen that it is a relatively simple method of this invention to make the improved belt tensioner 22 of this invention that is adapted to operate in a manner now to be described.

When the tensioner 22 of this invention has been mounted by its support member 44 to the bracket 37 of the engine 20 in the manner previously described so that the idler pulley 41 thereof is engaging against the belt 21 under the urging force of the springs 79, the installer can adjust the adjusting members 65 upwardly or downwardly relative to the top plate 58 so that the springs 79 will be under a certain initial compression and thereby be providing a predetermined force against the belt 21 in the at rest position of the engine 20. In addition, the flow control valve 106 has been either factory adjusted or installer adjusted to set the desired differential flow characteristics between the chambers 98 and 99 of the dampening means 40.

Thereafter, each time the engine 20 is initially started so as to cause slack in the slack side 33 thereof and provided a tensioning force thereon as determined by the force of the springs 79, such inward movement of the pulley 41 causes the piston member 85 to move downwardly in FIG. 7 and displace fluid in the chamber 99 through the passage defining means 100 and the flow control valve means 106 to the chamber 98 in a manner to dampen such downward movement of the pulley 41.

Thus, it can be seen that as the belt 21 is traveling in the direction of the arrow 35 in FIGS. 1 and 2 by the running engine 20, any vibrations and oscillations of the belt 21, such as caused by the turning on and off of the air conditioning compressor 31 as previously set forth, will cause an up and down oscillation of the portion 33 of the belt 21 which movement is imposed on the pulley 41 of the tensioner 22.

In those instances where the deflection of the portion 33 of the belt 21 is upwardly in FIGS. 1 and 2 to tend to cause the pulley 41 to move upwardly relative to the support means 36, such movement causes the piston member 85 to move upwardly and thereby force the fluid from the chamber 98 through the passage defining means 100 and flow control valve 106 to the chamber 99 and since the flow control valve 106 is set to restrict such flow at a greater rate than in the reverse direction of fluid flow through the passage defining means 100, such upward movement of the pulley 41 relative to the support means 36 is at a slower rate than when the pulley 41 is being moved downwardly away from the support means 36, the flow control means 106 being such that even the downward movement of the pulley 41 away from the support means 36 is dampened to a certain degree.

In this manner, it is believed that the dampening means 40 of this invention will prolong the life of the tensioner 22 so that rapid oscillations of the springs 79 thereof cannot take place and the springs 79 will perform their tensioning function in a relatively smooth manner.

In particular, since the flow control means 106 provides a preferential flow ratio that can be controlled, the tensioner 22 will deliver increased tension on the belt 21 when the belt 21 is subjected to acceleration and/or heavy cyclic loads commonly encountered in belt drive systems. Accordingly, if the fluid flow from chamber 98 to chamber 99 is more restrictive than reverse flow, load fluctuations in the belt system will result in an increased pressure on the top side 88 of the piston 85 which will force the idler pulley 41 down into the belt 21 and result in greater belt tension. In this manner, the tensioner 22 will deliver greater tension when the system demands and less tension when less tension is required. This can result in increased bearing life in belt driven accessories, reduced belt slippage under heavy loading conditions, and an increased effective life of the tensioner 22 itself.

While one form of fluid dampening means 40 for the tensioner 22 of this invention has been illustrated and described, it is to be understood that other fluid dampening means can be utilized for the tensioner 22 of this invention, as desired.

Figure 8:
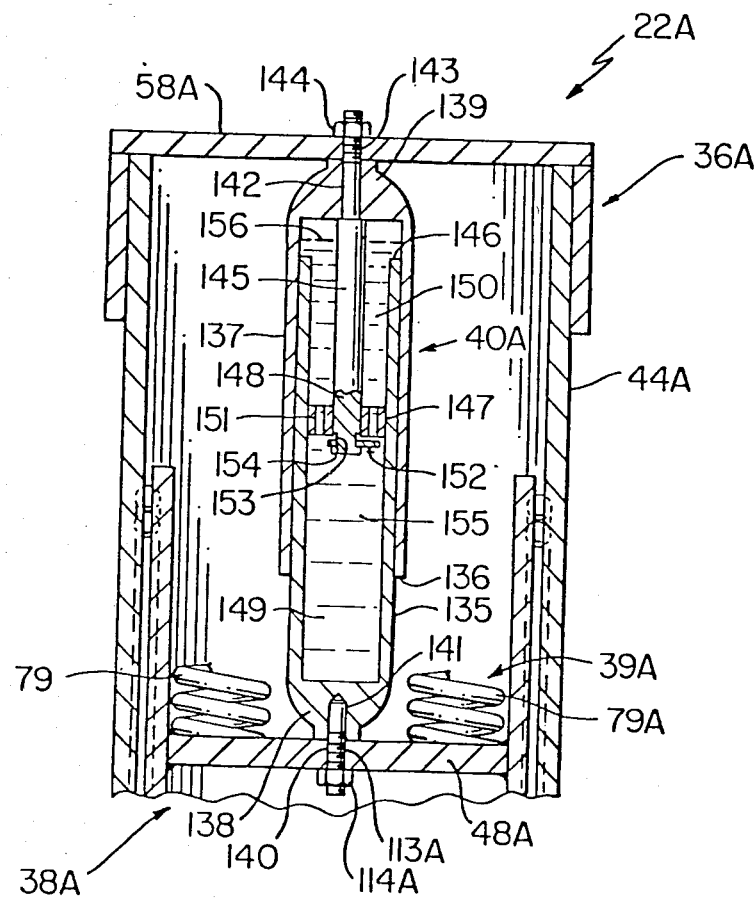
FIG. 8 is a view similar to FIG. 3 and illustrates another embodiment of the belt tensioner of this invention.

For example, another belt tensioner of this invention is generally indicated by the reference numeral 22A in FIG. 8 and parts thereof similar to the tensioner 22 previously described are indicated by like reference numerals followed by the reference letter "A".

As illustrated in FIG. 8, the tensioner 22A is substantially identical to the tensioner 22 previously described except that the fluid dampening means 40A thereof compresses a substantially conventional shock absorber structure having a first tubular member 135 telescoped in sliding and sealing relation within an open end 136 of another tubular member 137, a closed end 138 of the tubular member 135 being secured to the plate 48A of the belt engaging means 38A while a closed end 139 of the tubular member 137 is secured to the top plate 58A of the support member 44A so as to be interconnected to the support means 36A.

In particular, the closed end 138 of the tubular member 135 is secured to the plate 48A by a fastening means 140 being disposed in the opening 113A of the plate 48A and being held thereto by the nut 114A, the fastening means 140 being secured in an opening 141 in the closed end 138 of the tubular member 135 in any suitable manner.

The closed end 139 of the tubular member 137 has a fastening means 142 carried thereby and being received in an opening 143 passing through the top wall 58A of the support means 44A and being secured thereto by a suitable nut 144.

The fastening means 142 also includes a piston-like rod 145 being suspended within an open end 146 of the tubular member 135 and carrying a piston means 147 on the lower end 148 thereof so that the piston means 147 is held stationary by the support means 44A while the tubular member 135 is adapted to slide relative to the piston means 147.

The piston means 147 divides the tubular member 135 into two chamber sections 149 and 150, the piston member 147 having a plurality of openings 151 passing therethrough to fluidly interconnect the chambers 149 and 150 together.

However, a movable valve member 152 is carried on a reduced sleeve portion 153 of the end 148 of the rod 145 so that the valve member 152 can be disposed against a lower shoulder 154 of the rod 148 and thereby be disposed away from some of the passages 151 of the piston member 147 while being adapted to move upwardly on the sleeve portion 153 to engage against the piston member 147 and close off one or more of the passages 151 in a manner and for a purpose hereinafter described.

A suitable hydraulic fluid, such as a hydraulic oil 155, is disposed in the chambers 149 and 150 and in the embodiment illustrated in FIG. 8, the chamber 150 is only filled to a level 156 in order to compensate for the amount of volume being taken up by the open end 146 of the tubular member 135 telescoping upwardly into the tubular member 137 as will be apparent hereinafter.

Therefore, it can be seen that it is a relatively simple method of this invention to make the tensioner 22A in the manner previously described in connection with the tensioner 22 and merely substitute the shock absorber means 40A for the fluid dampening means 40 thereof to operate in a manner now to be described.

After the support means 36A has been mounted to the engine bracket 37 in the manner previously described and the initial compression force of the compression springs 39A have been set in the manner previously described for the tensioner 22, any downward movement of the belt engaging means 38A under the force of the compression springs 79A causes the tubular member 135 to move downwardly relative to the tubular member 137 and thereby increase the volume of the chamber 149 so that a resulting vacuum condition in the chamber 149 immediately draws fluid from the chamber 150 through the openings 151. The openings 151 are so sized that the same provide a desired dampening to such downward movement of the belt engaging means 38A. Of course, the openings 151 can be so designed that there will be no restriction of such downward movement of the belt engaging means 38A under the force of the compression springs 79A if desired.

Conversely, when the engaged belt tends to move the belt engaging means 38A upwardly in FIG. 8, such upward movement of the tubular member 135 relative to the tubular member 137 tends to cause a decrease in the volume of the chamber 149 so that the fluid 155 therein is forced through the openings 151 into the chamber 150. However, such upward flow of the fluid 155 relative to the stationary piston 147 causes the valve member 152 to move upwardly and close off one or more of the passages 151 so that the fluid flow through the piston member 147 from the chamber 149 to the chamber 150 is restricted to thereby restrict upward movement of the belt engaging means 38A at a rate greater than when the belt engaging means 38A is moved downwardly for the reasons previously set forth in connection with the tensioner 22.

Therefore, it can be seen that the shock absorber means 40A is disposed in a parallel relation between the parallel springs 79A to render the tensioner 22A relatively small and compact in the same manner that the piston and cylinder means 84, 85 is disposed in a parallel relation to the springs 79 to render the tensioner 22 relatively small and compact, the shock absorber means 40A and piston and cylinder means 84, 85 each functioning to fluid dampen movement of the respective belt engaging means 38A and 38 relative to the respective support means 36A and 36.

Another belt tensioner of this invention is generally indicated by the reference numeral 22B in FIGS. 9-12 and parts thereof similar to the tensioners 22 and 22A previously described are indicated by like reference numerals followed by the reference letter "B."

Figure 9:
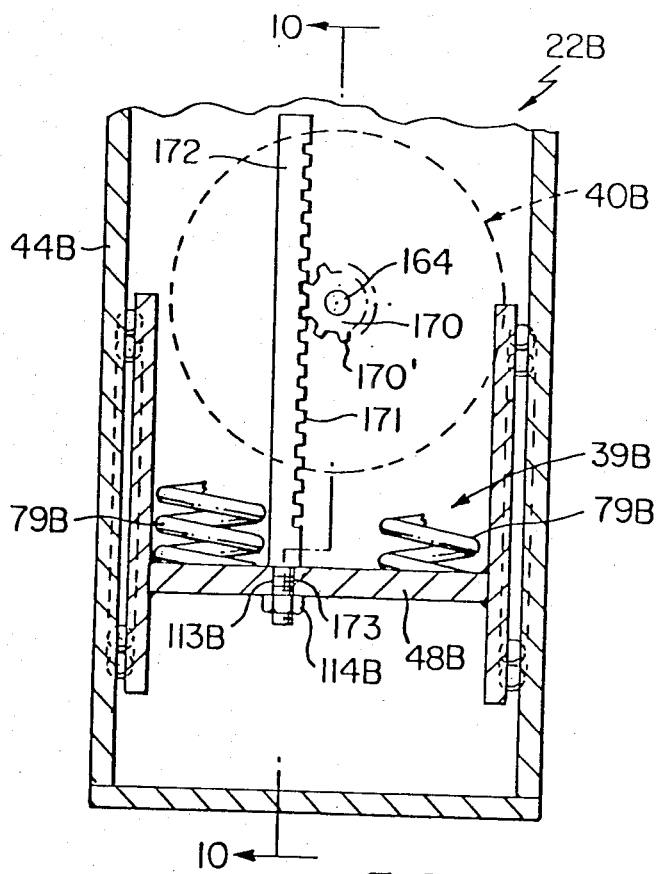
FIG. 9 is a view similar to FIG. 8 and illustrates another embodiment of the belt tensioner of this invention.
Figure 12:
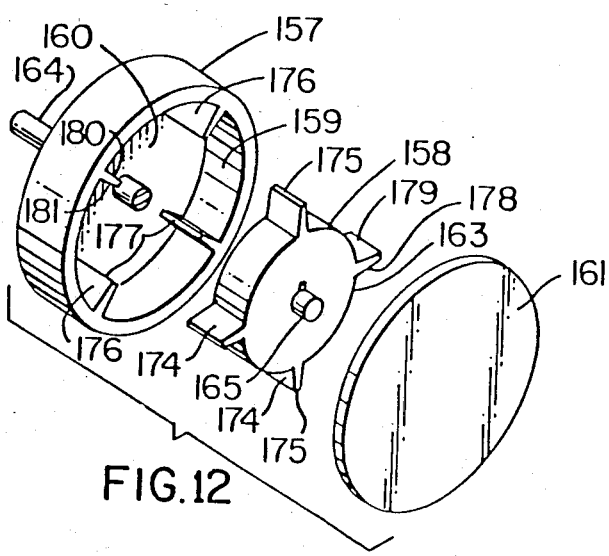
FIG. 12 is an exploded perspective view illustrating the parts of the fluid dampening means of the belt tensioner of FIGS. 9 and 10.
Figure 10:
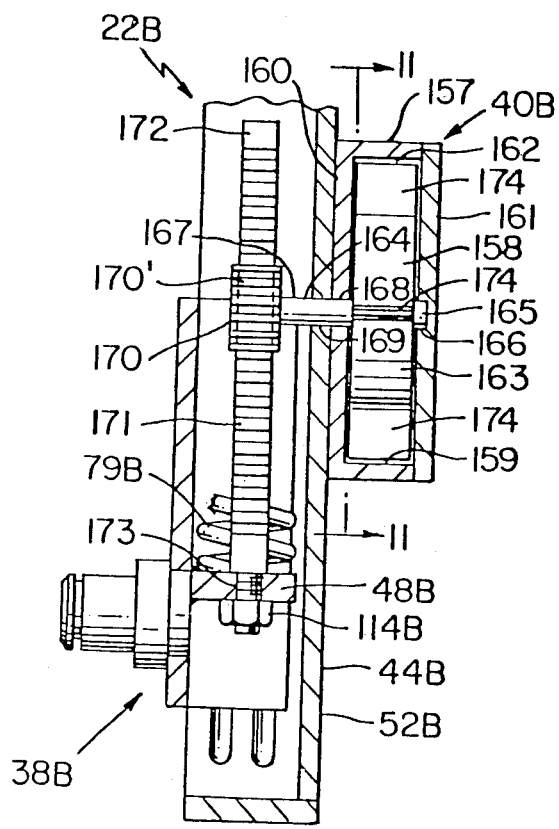
FIG. 10 is a side view of the belt tensioner of FIG. 9 and is taken in the direction of the arrows 10—10 thereof.

As illustrated in FIGS. 9 and 10, the tensioner 22B is essentially the same as the tensioner 22 previously described except that the same utilizes another fluid dampening means of this invention that is generally indicated by the reference numeral 40B and comprises an outer ring-like member 157 and an inner ring-like member 158 disposed in the outer ring member 157 with the ring members 157 and 158 being arranged for relative rotational movement therebetween whereby the fluid dampening means 40B comprises a rotary dampening means.

In particular, the ring-like member 157 is substantially cylindrical with an inner peripheral cylindrical surface 159 and a rear wall 160 cooperates with a closure or front wall member 161 to define a chamber 162 within the ring-like member 157.

The inner ring-like member 158 comprises a substantially cylindrical member having an outer peripheral cylindrical surface 163 adapted to face the internal peripheral surface 159 of the outer ring member 157 and is mounted on a central shaft 154 that has one end 165 journaled in a closed ended bore 166 in the cover member 161 and another end 167 that passes through an opening 168 in the rear wall 160 of the outer ring member 157.

The rear wall 160 of the outer ring member 157 is adapted to be secured to the rear wall 52B of the support member 44B of the tensioner 22B in any suitable manner, such as by welding or the like, with the shaft 164 of the dampening means 40B passing through an opening 169 in the rear wall 52B while being rotatable therein.

The end 167 of the shaft 164 carries a pinion gear 170 that has its gear teeth 170′ adapted to be disposed in meshing engagement with teeth 171 of a rack-like member 172 secured to the transverse wall 48B of the belt engaging means 38B of the tensioner 22B. For example, the rack-like member 172 can have an externally reduced rod-like part 173 passing through the opening 113B in the wall 48B to be secured thereto by the nut 114B whereby the rack-like part 172 of the fluid dampening means 40B is mounted in parallel relation between the parallel springs 79B and thereby permits the up and down movement of the wall 48B to be translated into rotary movement of the shaft 164 and, thus, rotary movement of the inner ring-like member 158 relative to the outer ring-like member 157 for a purpose hereinafter described.

The inner ring-like member 158 has a plurality of circumferentially spaced and radially outwardly extending vanes 174 having free ends 175 disposed closely adjacent the internal peripheral surface 159 of the outer ring-like member 157 for a purpose hereinafter described.

Similarly, the outer ring-like member 157 has a plurality of circumferentially spaced and radially inwardly extending vanes 176 respectively provided with free ends 177 disposed closely adjacent the outer peripheral surface 163 of the inner ring-like member 158 for a purpose hereinafter described, the vanes 176 of the outer ring-like member 157 and the vanes 174 of the inner ring-like member 158 being disposed in the staggered relation illustrated in FIG. 11 to permit limited rotary movement of the inner ring-like member 158 in both a clockwise and counterclockwise direction until the vanes 174 abut against the vanes 176 as will be apparent because the vanes 176 are disposed in the rotary path of movement of the vanes 174.

By disposing a suitable dampening fluid in the chamber 162 of the rotary dampening means 40B, such as a hydraulic oil, grease or the like, the rotary movement of the inner ring-like member 158 relative to the outer ring-like member 157 can be controlled by the degree of spacing provided between the outer free ends 175 and 177 of the vanes 174 and 176 and the cooperating peripheral surfaces 159 and 163 of the ring-like members 157 and 158 as will be apparent hereinafter.

Also, the amount of fluid dampening in the direction of rotation of the inner ring-like member 158 relative to the outer ring-like member 157 can be preferentially controlled by changing the angle of attack of one side 178 or 179 of the vanes 174 relative to the other side 179 and 178 thereof and/or the angle of attack of one side 180 or 181 of the vanes 176 relative to the other side 181 or 180 thereof. In addition or alternately thereto, the vanes 174 and/or vanes 176 can be provided with one-way check valves in passages passing through the opposed sides 178 and 179 thereof to permit unrestricted flow in one direction therethrough and restricted flow in the other direction therethrough. Also such passages could be flow restrictive without check valves therein.

In any event, when the desired dampening fluid, such as a hydraulic oil, grease or the like is disposed within the chamber 162, the dampener 40B will dampen up and down movement of the belt engaging means 38B of the tensioner 22B through rotary movement of the inner ring-like member 158.

Therefore, it can be seen that it is a relatively simple method of this invention to form the tensioner 22B in the manner previously described and to utilize the rotary dampener 40B of this invention therewith to operate in a manner now to be described.

Figure 11:
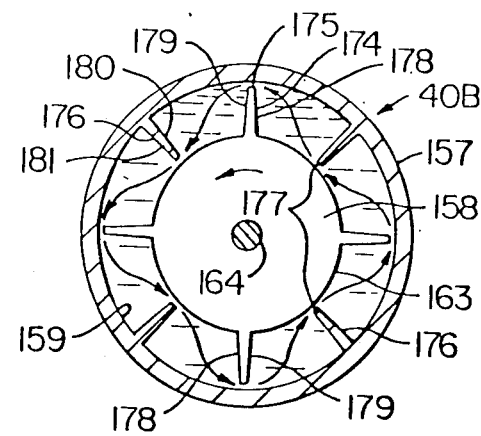
FIG. 11 is a cross-sectional view of the fluid dampening means of the belt tensioner of FIGS. 9 and 10 and is taken on lines 11—11 of FIG. 10.

After the tensioner 22B has been mounted to the mounting bracket 37 of the engine 20 and the force of the springs 79B has been set in the manner previously described for the tensioner 22, subsequent downward movement of the belt engaging means 38B under the force of the compression springs 79B in a belt tensioning direction causes the rack-like member 172 to move downwardly therewith and thereby rotate the pinion gear 170 in a counterclockwise direction in FIG. 9 to cause counterclockwise rotation of the shaft 164 and, thus, counterclockwise rotation of the inner ring-like member 148 relative to the outer ring-like member 157 in FIG. 11 whereby the inner vanes 174 tend to drive the fluid against the sides 179 thereof toward the sides 180 of the outer vanes 176 and thereby cause the hydraulic fluid in the collapsing pockets between the vanes 174 and 176 to be forced between the free ends 177 of the vanes 176 and the inner peripheral surface 163 of the inner ring-like member 58 as well as through the spacing between the free ends 175 of the inner vanes 174 and the inner peripheral surface 159 of the outer ring-like member 157 in a manner to retard or restrict such downward movement of the belt engaging means 38B for the dampening reasons previously set forth.

Conversely, when the tensioned belt tends to move the belt engaging means 38B upwardly in FIGS. 9 and 10, such upward movement of the transverse wall 48B carries the rack-like member 172 therewith and causes the pinion gear 170 to rotate in a clockwise direction in FIG. 9 and thereby cause clockwise rotation of the inner ring-like member 158 relative to the outer ring-like member 157 so that the inner vanes 174 have the sides 178 thereof tending to compress the fluid toward the sides 181 of the outer vanes 176. Thus, the fluid in the collapsing pockets of the dampener 40B is forced through the space between the inner free ends 177 of the outer vanes 176 and the inner peripheral surface 163 of the inner ring-like member 158 as well as between the outer free ends 175 of the inner vanes 174 and the inner peripheral surface 159 of the outer ring member 157 to restrict such rotary movement and thereby dampen the upward movement of the belt engaging means 38B relative to the support means 36B.

As previously set forth, by making the rotary motion of the dampener 158 more restrictive in the clockwise rotation thereof in FIG. 11 than in the counterclockwise rotation thereof, a greater restrictive force will be imposed on the belt engaging means 38B in a direction thereof away from the belt than toward the belt for the reasons previously set forth.

While the rotary dampening means 40B of this invention has been illustrated and described as being particularly adapted to provide a fluid dampening means for the tensioner 22B it is to be understood that the rotary dampener 40B of this invention can be utilized for dampening other devices than belt tensioners as desired whereby the fluid dampening device 40B of this invention is not to be limited to only a belt tensioner arrangement.

Another belt tensioner of this invention is generally indicated by the reference numeral 22C in FIGS. 13–21 and parts thereof similar to the tensioners 22, 22A and 22B previously described are indicated by like reference numerals followed by the reference letter "C".

Figure 13:
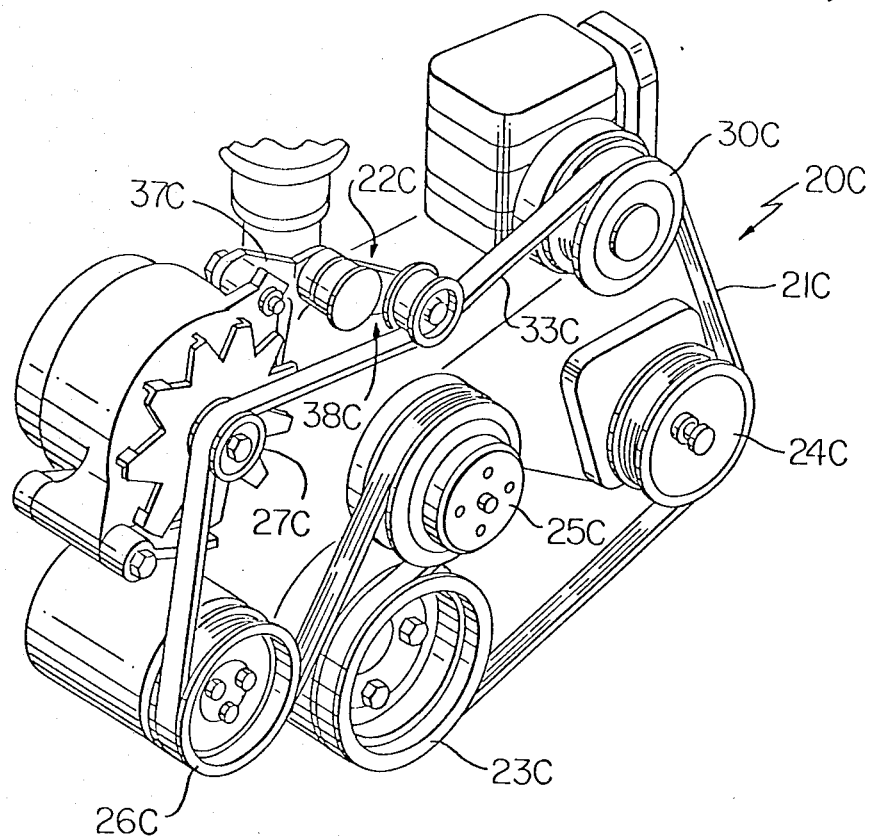
FIG. 13 is a view similar to FIG. 1 and is thereby a fragmentary isometric view looking toward the front end of an automobile engine which utilizes another embodiment of the belt tensioner of this invention.
Figure 14:
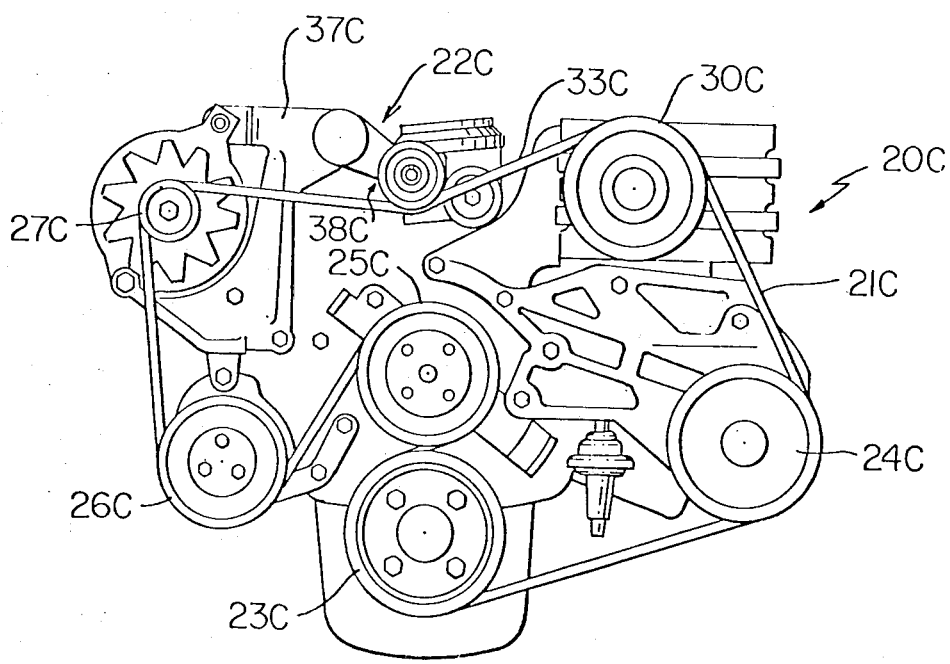
FIG. 14 is a view looking perpendicularly toward the front end of the automobile engine of FIG. 13.

As illustrated in FIGS. 13 and 14, it can be seen that the belt tensioner 22C is mounted to the mounting bracket 37C of the automobile engine 20C having the endless power transmission belt 21C being driven by the drive pulley 23C to drive the pulleys 24C, 25C, 26C, 27C and 30C in the manner previously described.

The belt tensioner 22C of this invention is believed to function in substantially the same manner as the tensioners 22, 22A, and 22B previously described for tensioning the belt 21C as the tensioners 22, 22A, 22B and 22C all have basically the same general structure.

Figure 16:
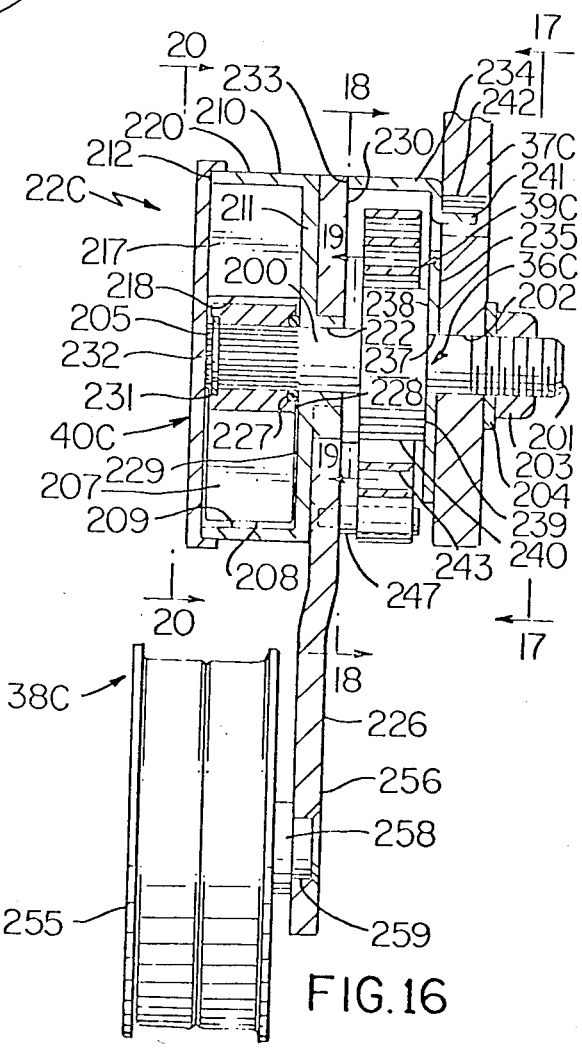
FIG. 16 is a fragmentary cross-sectional view of the belt tensioner of FIG. 15 and is taken on line 16—16 of FIG. 15.

In particular, the tensioner 22C comprises a support means that is generally indicated by the reference numeral 36C and is adapted to be fixed to the mounting bracket 37C of the engine 20C as illustrated in FIGS. 13, 14 and 16. The tensioner 22C has a belt engaging means that is generally indicated by the reference numeral 38C and is movably carried by the support means 36C in a manner hereinafter set forth. The tensioner 22C has mechanical spring means that is generally indicated by the reference numeral 39C and is operatively associated with the support means 36C and the belt engaging means 38C to tend to urge the belt engaging means 38C against the slack side 33C of the belt 21C as illustrated in FIGS. 13 and 14.

The belt tensioner 22C also includes a fluid dampening means that is generally indicated by the reference numeral 40C and is operatively associated with the support means 36C and the belt engaging means 38C to dampen movement of the belt engaging means 38C relative to the support means 36C in substantially the same manner as the dampening means 40, 40A and 40B previously described except that the dampening means 40C is a rotary dampening means and is, therefore, similar to the rotary dampening means 40B previously described.

Therefore, it can be seen that the tensioner 22C is in general similar to the tensioners 22, 22A and 22B previously described but has unique features not found in the tensioners 22, 22A and 22B as will be apparent hereinafter.

For example, the rotary dampening means 40C and mechanical spring means 39C of the tensioner 22C of this invention are coaxially aligned to render the tensioner 22C substantially small and compact.

In particular, the support means 36C includes a shaft 200 having an outer end 201 that is externally threaded and adapted to project through an opening 202 in the mounting bracket 37C as illustrated in FIG. 16 to be secured thereto by a nut 203 and washer 204 whereby the shaft 200 is held stationary by the mounting bracket 37C as will be apparent hereinafter.

The shaft 200 of the support means 36C has its other end 205 splined to an inner ring member 206 of the rotary dampening means 40C, the inner ring member 206 having a plurality of spaced apart vanes 207 extending radially outwardly therefrom so that the free ends 208 thereof are disposed closely adjacent the internal peripheral surface 209 of an outer member 210 in substantially the same manner as the inner ring member 158 and outer ring member 157 of the rotary dampening means 40B previously described except that in the rotary dampening means 40C of the tensioner 22C, the inner ring member 206 is held stationary and the outer ring member 210 is rotated relative thereto as will be apparent hereinafter.

The outer ring member 210 of the rotary dampening means 40C comprises a cup-shaped member having a closed end defined by a wall 211 and an open end 212 adapted to be sealed closed by an end cap or plate 124 in any suitable manner whereby the outer ring member 210 defines a chamber 215 inside the same and in which a dampening fluid 216 can be disposed, such as a hydraulic oil, grease or the like, to function in the same manner as the dampening fluid in the rotary dampening means 40B previously described.

The outer ring member 210 has a plurality of spaced apart and radially inwardly directed vanes 217 which have their inner free ends 218 disposed closely adjacent the external peripheral surface 219 of the inner ring member 206 for the reasons previously set forth in connection with the dampening means 40B, the vanes 217 of the outer ring member 210 being disposed substantially half way between the vanes 207 of the inner ring member 206 when the tensioner 22C is in the full line position illustrated in FIGS. 15 and 20 for a purpose hereinafter described.

The end wall 211 of the outer ring member 210 is substantially flat and circular so as to cooperate with the substantially flat and circular cover member 214 and the substantially cylindrical side wall means 220 of the outer ring member 210 to define a substantially cylindrical casing 221.

The end wall 211 of the casing 221 has a central opening 222 passing therethrough and through which the shaft 200 extends, the end wall 211 of the casing 221 having an integral cylindrical hub portion 223 disposed on the shaft 200 to rotatably mount the casing 221 and, thus, the outer ring member 210 on the support means 36.

The hub 223 of the end wall 211 of the rotary dampening means 40C includes a plurality of spaced apart radially outwardly disposed abutments 224 adapted to be respectively received in a cooperating cutout means 225 in an arm 226 of the belt engaging means 38C to spline the arm to the outer ring member 210 so that the arm 226 and outer ring member 210 will rotate in unison on the shaft 200 of the support means 36C as will be apparent hereinafter.

In order to seal the chamber 215 of the casing 221 at the opening 222 in the end wall 211 of the casing 221, a resilient O-ring seal member 227 is held under compression between the side 228 of the inner ring member 206 and the inside surface 229 of the end wall 211 as the end wall 211 and the end 230 of the arm 226 are sandwiched between the side 228 of the inner ring member 206 by a C-clip 231 received in an annular groove 232 in the end 205 of the shaft 200 and the open end 233 of a cup-shaped housing 234 fixed to the shaft 200.

The cup-shaped housing 234 has a closed end defined by a wall 235 and a substantially cylindrical side wall means 236 that has substantially the same diameter as the diameter of the casing 221 whereby the casing 221 and housing 234 are disposed in substantially coaxially aligned relation to render the tensioner 22C substantially small and compact as is apparent from the drawings.

The closed end wall 235 of the housing 234 has a central opening 237 passing therethrough and through which the end 201 of the shaft 200 projects. After the housing 234 is telescoped onto the end 201 of the shaft 200 so that the inside surface 238 of the end wall 235 abuts against a side 239 of an enlarged cylindrical portion 240 of the shaft 200, the end wall 235 is secured to the shaft 200 in any suitable manner, such as by spot welding the end wall 235 to the side 239 of the enlargement 240 of the shaft 200. In any event, it can be seen that the housing 234 is fixed to the shaft 200 so as to be stationary therewith.

The end wall 235 of the housing 234 is provided with an outwardly directed tang 241 that is carved therefrom so as to project into an opening 242 in the mounting bracket 37C to prevent rotation of the housing 234 and, thus, the shaft 200 when the shaft 200 is secured to the bracket 36C by the nut 203 as illustrated in FIG. 16. Thus, the support means 36C of the tensioner 22C is adapted to be fixed from rotation on the mounting bracket 37C in substantially the same manner as the tensioners 22, 22A and 22B previously described.

Figure 21:
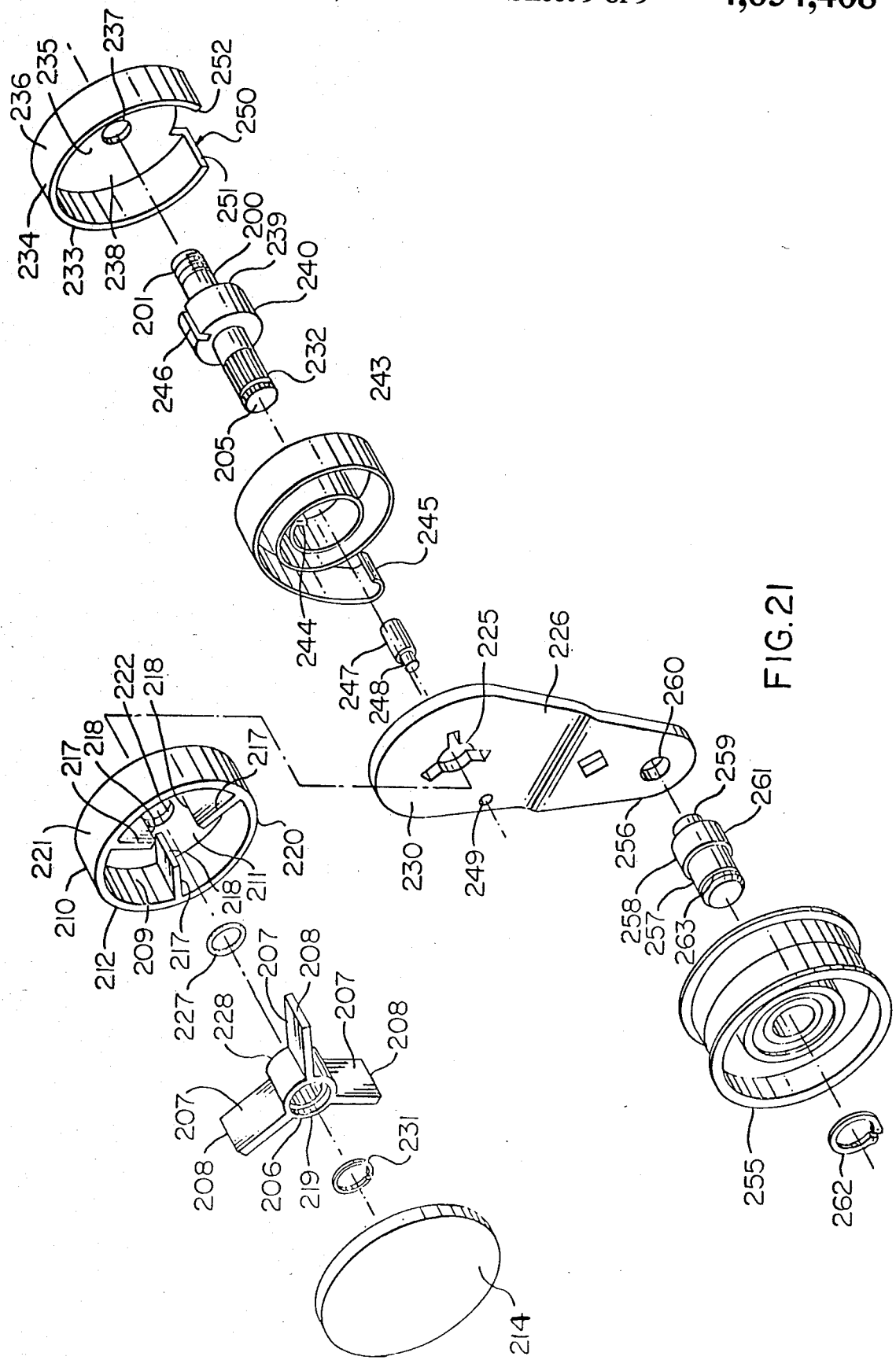
FIG. 21 is an exploded isometric view of the various parts of the belt tensioner of FIGS. 15-20.

The mechanical spring means 39C of the tensioner 22C of this invention comprises a coiled torsion spring 243 having an inner end 244 and an outer end 245. The spring 243 is coiled as illustrated in FIG. 21 and has the inner end 244 thereof bent so as to project radially inwardly and be received in a longitudinal slot 246 formed in the enlarged cylindrical portion 240 of the shaft 200 so as to operatively interconnect the inner end 244 of the spring 243 to the support means 36C.

The outer end 245 of the spring 243 is operatively interconnected to the belt engaging means 38C by having the same bent to be looped around a cylindrical pin 247 carried by the arm 226 of the belt engaging means 38C, the pin 247 having a reduced portion 248 secured in any suitable manner in an opening 249 passing through the arm 226 as illustrated.

The outer end 245 of the torsion spring 243 projects out through a slot 250 formed in the cylindrical side wall means 236 of the housing 234 which defines opposed stop surfaces 251 and 252 on the housing 234.

Figure 15:
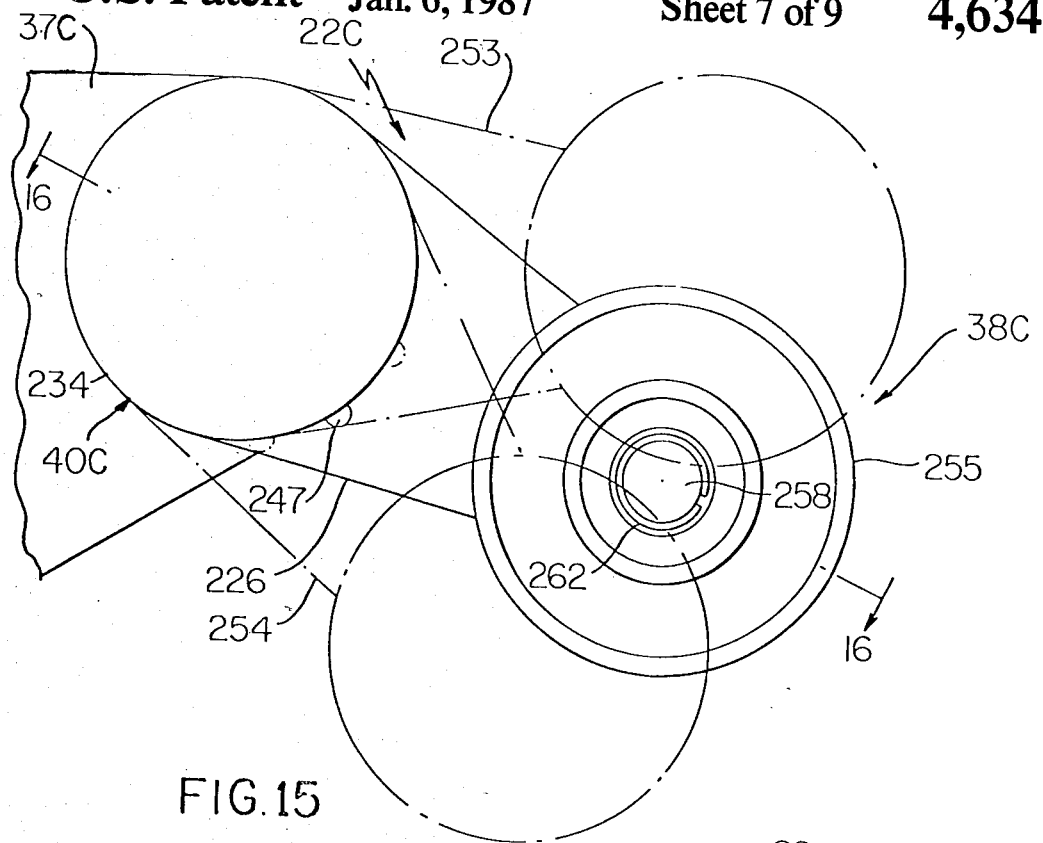
FIG. 15 is an enlarged fragmentary front view of the belt tensioner of this invention that is being utilized for tensioning the power transmission belt of FIGS. 13 and 14 and illustrates various positions thereof.
Figure 17:
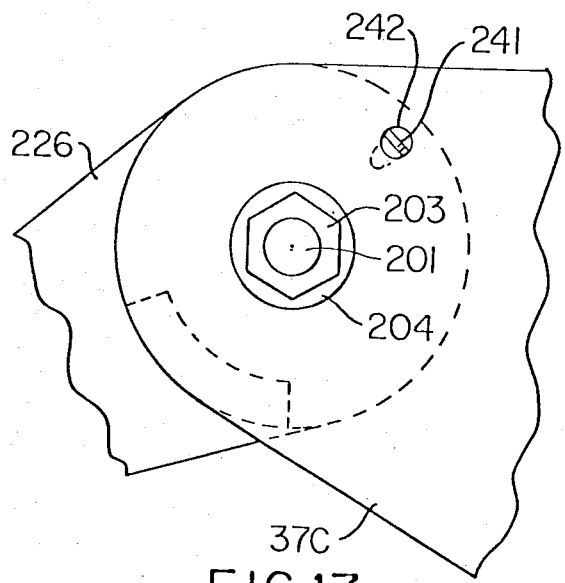
FIG. 17 is a fragmentary rear view of the belt tensioner of FIG. 15 and is taken in the direction of the arrows 17—17 of FIG. 15.

In particular, since the end 245 of the spring 243 projects out through the slot 250 of the housing 234, rotation of the arm 226 of the belt engaging means 38C in a counterclockwise direction relative to the stationary housing 234 as indicated in FIG. 15 would carry the end 245 of the spring 243 in a counterclockwise direction until the same abuts the stop 252 as illustrated by the phantom lines 253 in FIG. 15. Conversely, should the belt engaging means 38C rotates in a clockwise direction in FIG. 15, the arm 226 will carry the end 245 of the spring 243 therewith until the end 245 abuts the surface 251 of the housing 234 as represented by the phantom lines 254 in FIG. 15. Thus, it can be seen that the rotary movement of the arm 226 and, thus, of the belt engaging means 38C is limited by the stop surfaces 251 and 252 on the housing 234 of the support means 36C. However, such rotational movement of the arm 226, and, thus, of the belt engaging means 38C is sufficient for providing the necessary tensioning movement on the belt 21C and will compensate for all oscillations thereof as will be apparent hereinafter. Also such movement of the belt engaging means 38C as illustrated in FIG. 15 is permitted by the spacing between the vanes 207 and 217.

The belt engaging means 38C includes a conventional pulley 255 rotatably mounted to the end 256 of the arm 226 in any suitable manner, such as by being rotatably disposed on and end 257 of a shaft 258 having its other end 259 secured in any suitable manner in an opening 260 in the end 256 of the arm 226, the pulley 255 being held on the shaft 258 between an enlargement 261 thereof and a C-ring 262 disposed in an annular groove 263 in the end 257 of the shaft 258 as illustrated in the drawing. Thus, the pulley 255 can engage against the belt 21C and be rotated thereby in a manner well known in the art.

While the various parts of the tensioner 22C previously described can be formed of any suitable materials, the same, except for the sealing O-ring 227, can be formed of metal if desired.

In any event, it can be seen that it is a relatively simple matter to make the tensioner 22C of this invention by the method of this invention from the parts thereof previously described to operate in a manner now to be described.

The support means 36C of the tensioner 22C is mounted to the mounting bracket 37C of the engine 20C in such a manner that the normal position of the belt engaging means 38C engaging the belt 21C under the force of the spring means 39C is as illustrated in FIGS. 13 and 14 and is such that the arm 226 is disposed in the intermediate full line position illustrated in FIG. 15 so that the torsion spring 243 is tending to urge the pulley 255 in a clockwise direction against the belt 21C, the adjustment of the belt engaging means 38C during the mounting of the support means 36C being facilitated by a suitably shaped opening 264 passing through the arm 226 to receive a suitable tool for rotating the arm 226 in opposition to the force of the torsion spring 243.

In all operating positions of the arm 226 of the belt engaging means 38C as represented by the full lines and phantom lines 253 and 254 in FIG. 15 of the drawings, the torsion spring 243 has a force tending to move the belt engaging means 38C in a clockwise direction beyond the position 254 so as to always provide a tensioning force on the belt 21C.

Figure 20:
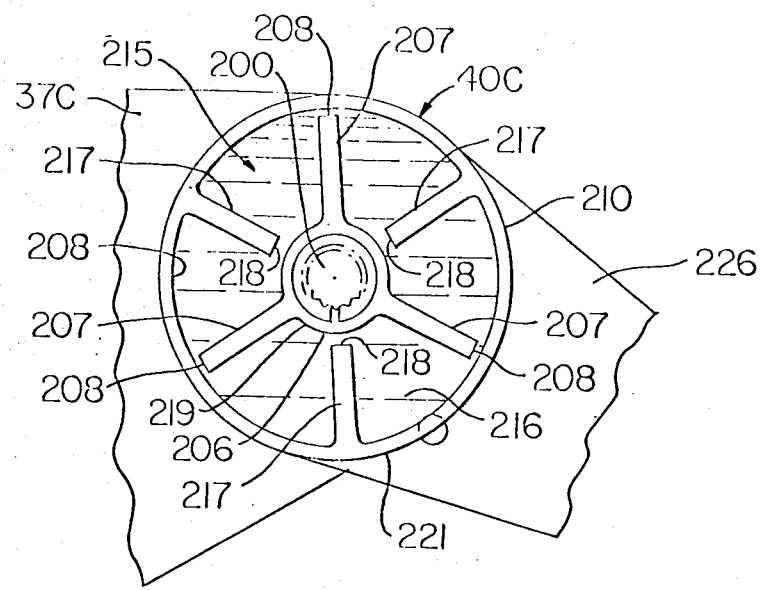
FIG. 20 is an enlarged fragmentary view of the fluid dampening means of the belt tensioner of FIG. 15 and is taken in the direction of the arrows 20—20, FIG. 20 having the cover of the fluid dampening means removed.
Figure 19:
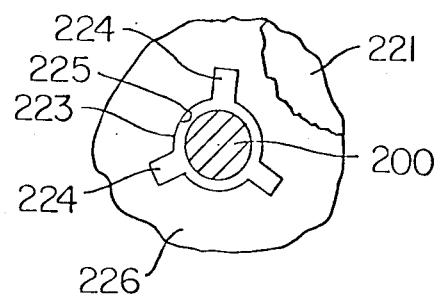
FIG. 19 is a fragmentary cross-sectional view taken on line 19—19 of FIG. 15.
Figure 18:
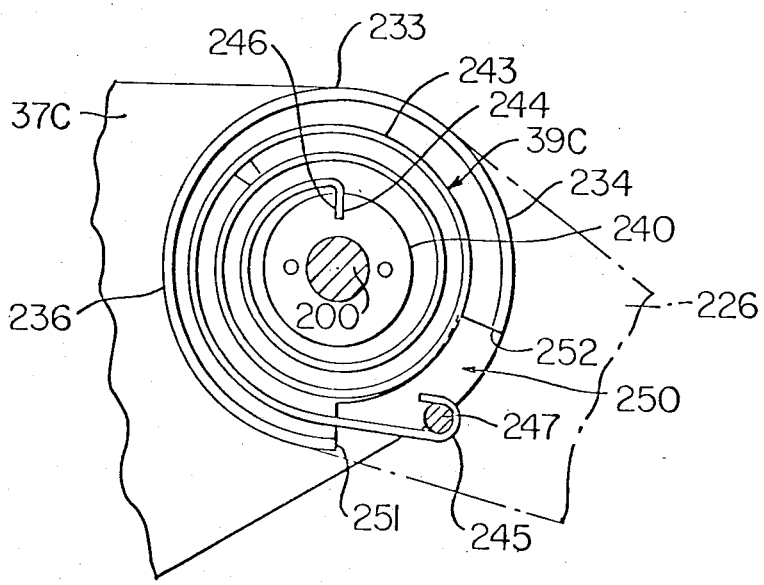
FIG. 18 is a fragmentary cross-sectional view of the tensioner of FIG. 15 and is taken on line 18—18 of FIG. 15.

Accordingly, assuming that the belt engaging means 38C is in the full line position illustrated in FIG. 15 against the belt 21C and a normal oscillation of the belt 21C during the operation of the engine 20C for the reasons previously set forth causes the belt engaging means 38C to move further inwardly toward the belt 21C in a clockwise direction in FIG. 15, such clockwise movement of the arm 226 causes the outer ring member 210 of the rotary dampening means 40C to rotate in a clockwise direction in FIG. 20 therewith whereby the action of the vanes 207 and 217 on the fluid 216 in the chamber 215 of the rotary dampening means 40C tends to retard such rotary movement of the outer ring member 210 relative to the stationary inner ring member 206 for the reasons previously described in connection with the rotary dampener 40B so as to dampen the movement of the belt engaging means 38C toward the belt 21C. Conversely, should the fluctuation of the belt 21C cause the belt engaging means 38C to move in a counterclockwise direction away from the belt 21C, such movement of the arm 226 causes the outer ring member 210 of the rotary dampening means 40C to move in a counterclockwise direction in FIG. 20 whereby the fluid 216 in the chamber 215 tends to retard such movement of the outer ring member 210 so as to dampen such oscillation of the belt 21C for reasons previously set forth.

Therefore, it can be seen that the tensioner 22C operates in substantially the same manner as the tensioners 22, 22A and 22B previously described by providing fluid dampening of the movement of the belt engaging means 38C relative to the support means 36C so as to tend to prevent early wear out of the mechanical spring means 39C that is operatively interconnected to the support means 36C and the belt engaging means 38C for the reasons previously set forth.

Thus, it can be seen that this invention not only provides an improved belt tensioner, but also this invention provides an improved method of making such a belt tensioner.

While the forms and methods of this invention now preferred have been illustrated and described as required by the Patent Statute, it is to be understood that other forms and methods steps can be utilized and still fall within the scope of the appended claims.

What is claimed is:

1. In a tensioner for a power transmission belt that is adapted to be operated in an endless path, said tensioner comprising a support means for being fixed relative to said belt, a belt engaging means carried by said support means and being movable relative thereto, mechanical spring means operatively associated with said support means and said belt engaging means for urging said belt engaging means relative to said support means and against said belt with a force to tension said belt, and fluid dampening means operatively associated with said support means and said belt engaging means to dampen the movement of said belt engaging means relative to said support means in at least one direction of movement thereof, said fluid dampening means comprising a rotary dampening means having a rotatable means and a longitudinal axis about which said rotatable means rotates, said spring means having a longitudinal axis and being spiraled about said axis thereof, said support means comprising a shaft means having a longitudinal axis and being fixed from movement relative to said belt engaging means, the improvement wherein said shaft means carries said dampening means and said spring means in spaced apart side-by-side relation thereon with said axis of said shaft means being substantially coaxial with said axes of said dampening means and said spring means whereby said rotary dampening means and said spring means are coaxially spaced apart and are coaxially aligned by said shaft means, said belt engaging means having a portion thereof disposed between said rotary dampening means and said spring means and being rotatably carried by said shaft means so as to rotate relative to said shaft means whereby said rotary dampening means and said spring means are coaxially spaced apart from each other by said portion of said belt engaging means.

2. A tensioner as set forth in claim 1 wherein said rotary dampening means comprises an outer ring member and an inner ring member disposed in said outer ring member, said members being arranged for relative rotational movement therebetween, one of said members being operatively interconnected to said support means, the other of said members being operatively interconnected to said belt engaging means and thereby being said rotatable means of said dampening means.

3. A tensioner as set forth in claim 2 wherein said inner ring member has a plurality of circumferentially spaced apart radially outwardly disposed vane means, said outer ring member having a plurality of circumferentially spaced apart radially inwardly disposed vane means cooperating with said vane means of said inner ring member to restrict relative rotational movement between said members in at least one direction.

4. A tensioner as set forth in claim 3 wherein said vane means of said inner ring member and said vane means of said outer ring member are disposed in the path of movement of each other when said relative movement is caused between said members.

5. A tensioner as set forth in claim 4 wherein said inner ring member has a substantially cylindrical outer peripheral surface, said outer ring member having a substantially cylindrical inner peripheral surface concentrically disposed in spaced relation to said outer peripheral surface of said inner ring member and facing the same, said vane means respectively having free end means, said vane means of each member having said free end means thereof disposed close adjacent said peripheral surface of the other of said members.

6. A tensioner as set forth in claim 2 wherein said spring means comprises a coiled torsion spring having an inner end and an outer end, said inner end of said spring being operatively interconnected to said inner ring member of said rotary dampening means and said outer end of said spring being operatively interconnected to said outer ring member of said rotary dampening means.

7. A tensioner as set forth in claim 6 wherein said belt engaging means comprises an arm having opposed ends, one of said opposed ends of said arm being interconnected to said other of said members of said rotary dampening means to rotate therewith, said portion of said belt engaging means being said one end of said arm.

8. A tensioner as set forth in claim 7 and including a cup-shaped housing having a closed end and an open end, said closed end of said housing comprising part of said support means, said open end of said housing being disposed closely adjacent said one end of said arm to be effectively closed thereby, said spring being disposed in said housing.

9. A tensioner as set forth in claim 8 wherein said housing has a substantially cylindrical side wall, said side wall having an opening therein, said outer end of said spring extending out of said opening of said housing.

10. A tensioner as set forth in claim 8 wherein said outer ring member defines a closed fluid containing casing having said inner ring member therein.

11. A tensioner as set forth in claim 10 wherein said housing and said casing respectively define substantially cylindrical units, said units being substantially coaxially aligned in spaced apart relation and having substantially the same diameter.

12. A tensioner as set forth in claim 8 wherein said open end of said cup-shaped housing has a pair of spaced apart stop means, said arm having means operatively engageable with said stop means to limit rotational movement of said arm on said shaft means, said cup-shaped housing having a substantially cylindrical side wall, said side wall having an opening therein that defines a pair of spaced apart shoulders on said side wall that comprise said stop means.

13. A tensioner as set forth in claim 7 wherein said belt engaging means further comprises a pulley for engaging said belt, said pulley being rotatably carried by the other of said opposed ends of said arm.

14. A tensioner as set forth in claim 7 wherein said inner ring member of said rotary dampening means comprises said one member that is operatively interconnected to said support means and said outer ring member comprises said other member that is operatively interconnected to said belt engaging means, said outer ring member defining a closed fluid containing casing, said arm having interconnecting means interconnected to said outer end of said spring.

15. A tensioner as set forth in claim 14 wherein said casing is rotatably mounted on said shaft means.

16. A tensioner as set forth in claim 15 wherein said inner ring member is secured to said shaft means, said shaft means having a first portion thereof disposed in said casing and a second portion extending outwardly from said casing, said spring being substantially concentrically disposed on said second portion and having said inner end thereof operatively interconnected to said second portion.

17. A tensioner as set forth in claim 16 and including a cup-shaped housing having a closed end and an open end, said closed end of said housing being secured to said second portion of said shaft means and said open end of said housing being disposed closely adjacent said one end of said arm to be effectively closed thereby, said spring being disposed in said housing.

18. A tensioner as set forth in claim 17 wherein said housing has a substantially cylindrical side wall, said side wall having an opening therein, said outer end of said spring extending out of said opening of said housing.

19. A tensioner as set forth in claim 18 wherein said arm has a pin extending therefrom, said outer end of said spring being interconnected to said pin so as to be operatively interconnected to said arm.

20. A tensioner as set forth in claim 17 wherein said housing and said casing respectively define substantially cylindrical units, said units being substantially coaxially aligned and having substantially the same diameter.

* * * * *